(12) United States Patent
Miyata

(10) Patent No.: US 7,698,729 B2
(45) Date of Patent: Apr. 13, 2010

(54) COMMUNICATION TERMINAL

(75) Inventor: Katsuya Miyata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1724 days.

(21) Appl. No.: 10/807,469

(22) Filed: Mar. 24, 2004

(65) Prior Publication Data
US 2005/0099491 A1 May 12, 2005

(30) Foreign Application Priority Data
Nov. 10, 2003 (JP) .............................. 2003-379290

(51) Int. Cl.
*H04N 7/16* (2006.01)
(52) U.S. Cl. .................. 725/151; 725/40; 725/135; 348/14.01; 348/729; 379/110.01; 379/102.03
(58) Field of Classification Search ............. 348/14.01, 348/14.04, 729, 570; 340/905, 441, 936; 725/40, 42, 90, 135, 89, 134, 102, 142, 91–97; 379/211.02, 110.01, 102.03, 93.17
See application file for complete search history.

(56) References Cited

U.S. PATENT DOCUMENTS

| | | | |
|---|---|---|---|
| 6,359,970 B1 | 3/2002 | Burgess | |
| 6,462,675 B1* | 10/2002 | Humphrey et al. | 340/905 |
| 6,510,556 B1* | 1/2003 | Kusaba et al. | 725/93 |
| 6,535,590 B2* | 3/2003 | Tidwell et al. | 379/110.01 |
| 7,227,583 B2* | 6/2007 | Sin | 348/570 |
| 2001/0047516 A1* | 11/2001 | Swain et al. | 725/86 |
| 2001/0051037 A1* | 12/2001 | Safadi et al. | 386/83 |
| 2002/0032613 A1* | 3/2002 | Buettgenbach et al. | 705/26 |
| 2002/0052225 A1 | 5/2002 | Davis et al. | |
| 2003/0138087 A1 | 7/2003 | Takeda et al. | |
| 2003/0208758 A1* | 11/2003 | Schein et al. | 725/42 |
| 2006/0179462 A1* | 8/2006 | Willame et al. | 725/90 |
| 2007/0248221 A1* | 10/2007 | Chatterjee et al. | 379/211.02 |

FOREIGN PATENT DOCUMENTS

| | | |
|---|---|---|
| JP | 5-56190 | 3/1993 |
| JP | 2001-101095 | 4/2001 |
| JP | 2002-223279 | 8/2002 |
| JP | 2002-288084 | 10/2002 |
| JP | P2002-288084 A | 10/2002 |
| WO | WO 02/03693 A1 | 1/2002 |

OTHER PUBLICATIONS

Japanese Office Action issued in corresponding Japanese Patent Application No. JP 2003-379290, dated Feb. 27, 2006.

* cited by examiner

*Primary Examiner*—Joseph P Hirl
*Assistant Examiner*—Joshua Taylor
(74) *Attorney, Agent, or Firm*—McDermott Will & Emery LLP

(57) ABSTRACT

A communication terminal comprising a video reproduction device configured to carry out a video reproduction, a communication device configured to carry out a communication; and a reproduction-end-time acquisition device configured to acquire an end time of the video reproduction carried out by said video reproduction device. When an incoming communication arrives from a communication partner terminal in the course of the video reproduction carried out by said video reproduction device, the communication partner terminal is informed of the end time of said video reproduction. The communication partner terminal is external to the communication terminal.

17 Claims, 12 Drawing Sheets

FIG. 4

| SEQUENCE NUMBER 401 | VIDEO PRIORITY MODE 402 | CRITERION 1 | CRITERION 2 | CRITERION 3 |
|---|---|---|---|---|
| * | ON | - | - | - |
| 1 | OFF | TELEPHONE-CONVERSATION PARTNER A | - | - |
| 2 | OFF | PROGRAM B | - | - |
| 3 | OFF | EMAIL SENDER C | - | - |
| 4 | OFF | 20:00-22:00 | 18:00-7:00 | PROGRAM E |

(Criterion 1, 2, 3 grouped as 403; Telephone-Conversation Partner D in criterion 2 of row 4)

FIG. 8

| SEQUENCE NUMBER | VIDEO PRIORITY MODE | CRITERION 1 | CRITERION 2 | CRITERION 3 | CRITERION 4 | CRITERION 5 | CRITERION LOGIC EXPRESSION |
|---|---|---|---|---|---|---|---|
| * | ON | – | – | – | – | – | – |
| 1 | OFF | TELEPHONE-CONVERSATION PARTNER A | – | – | – | – | 1 |
| 2 | OFF | SUNDAY | 20:00-22:00 | – | – | – | 1*2 |
| 3 | OFF | 08:45-17:15 | WEEKDAY | 12:00-12:45 | – | – | (1*2)#3 |
| 4 | ON | IN MOTION | WEEKDAY | 07:45-08:30 | 21:00-22:00 | TELEPHONE-CONVERSATION PARTNER B | 1*2*(3+4)#5 |
| 5 | OFF | ALREADY RECORDED | PRESENT POSITION AT HOME | VARIETY PROGRAM | – | – | 1+2+3 |

COMMUNICATION TERMINAL

BACKGROUND OF THE INVENTION

The present invention relates to a communication terminal. More particularly, the present invention relates to a cellular phone capable of receiving a TV program.

The conventional TV system connectable to a network adopts a technique whereby, in order to prevent the seeing and hearing of a TV program from being obstructed, the TV system displays an email-arrival-displaying screen showing detected arrivals of emails, which have been received while the user of the TV system is watching the TV program, after a program scene has been replaced by a commercial screen. This technique is disclosed for example in Japanese Patent Laid-open No. 2002-288084 serving as patent reference 1.

In accordance with the technique disclosed in patent reference 1, however, arrivals of phone calls and emails, which are received while the user is watching a TV program, are reported later without considering factors such as the priorities of the phone-call maker, the email sender and the TV program. That is to say, even though an incoming phone call or an incoming email is received while the user is watching the TV program, it is desirable to let the incoming phone call or the incoming email take precedence of a TV program being watched if the incoming phone call is made by an important caller or the incoming email has been sent by an important email sender and/or TV the program is not of much importance. Thus, although the TV program is not so significant as the incoming phone call or the incoming email, the user is not immediately informed of the arrival of the phone call or the email. In other words, if a TV program is not of importance to the user in comparison with an incoming phone call or an incoming email, it is desirable to inform the user of the arrival of the phone call or the email in accordance with the priority of the phone call or the priority of the email even if the phone call or the email is received while the user is watching the TV program.

In addition, the disclosed technique does not consider a feature of informing the phone-call maker of the end time of the TV program. Thus, the phone-call maker does not know when the TV program will end, allowing a received phone call to be accepted. As a result, in some cases, the phone-call maker needs to make a phone call again and again several times till the TV program watched by the user serving as the phone-call target is ended, giving rise to a trouble. If the phone-call maker is informed of the end time of the TV program in such a case, the trouble can be avoided, providing the phone-call maker and the phone-call target with convenience.

It is thus an object of the present invention addressing the problems described above to provide a communication terminal offering much convenience to the phone-call maker and the phone-call target.

SUMMARY OF THE INVENTION

In order to achieve the object described above, the present invention provides a communication terminal comprising:

a video reproduction device configured to carry out a video reproduction;

a communication device configured to carry out a communication; and a reproduction-end-time acquisition device configured to acquire an end time of the video reproduction carried out by said video reproduction device;

wherein, in the event of an incoming communication from a communication partner terminal, external to the communication terminal, in the course of the video reproduction carried out by said video reproduction device, said communication partner terminal is informed of the end time of said video reproduction.

In accordance with the present invention, it is thus possible to provide a communication terminal offering much convenience to the user.

BRIEF DESCRIPTION OF THE DRAWINGS

FIG. 4 is a diagram showing a first typical table of concrete incoming-reporting conditions;

FIG. 8 is a diagram showing a second typical table of concrete incoming-reporting conditions;

PREFERRED EMBODIMENTS OF THE INVENTION

Figure 1:
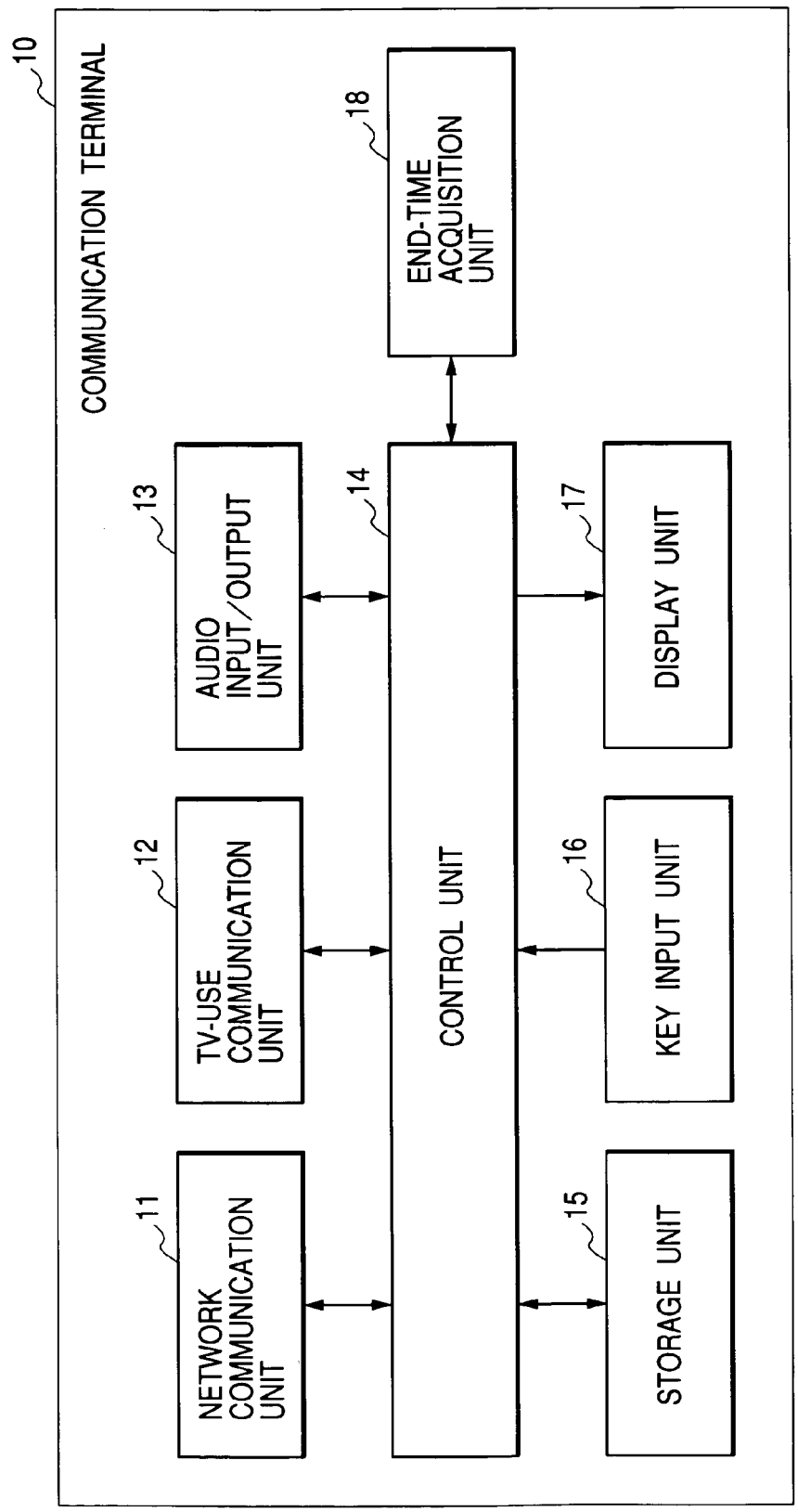
FIG. 1 is a diagram showing the configuration of a communication terminal provided by the present invention.

FIG. 1 is a diagram showing the configuration of a communication terminal 10. The communication terminal 10 is typically cellular phone or a PDA. As shown in the figure, the communication terminal 10 comprises a network communication unit 11, a TV-use communication unit 12, a audio input/output unit 13, a control unit 14, a storage unit 15, a key input unit 16, a display unit 17 and an end-time acquisition unit 18.

Connected to a radio or wired communication line, the network communication unit 11 is a component for communicating a service such as a phone call and data such as an email and a wave. In addition, the network communication unit 11 has a modulation means for modulating data to be transmitted and a demodulation means for demodulating received data. The modulation and demodulation means themselves are not shown in the figure though. The TV-use communication unit 12 is a component for receiving a TV broadcast such as an analog or digital broadcast transmitted through a radio or wired communication. The TV-use communication unit 12 includes a demodulation means for demodulating a received signal. This demodulation means is also not shown in the figure. The audio input/output unit 13 comprises an audio input unit such as a microphone and an audio output unit such as a speaker. The audio input unit is a component for converting an input sound or a voice into a signal. On the other hand, the audio output unit is a component for generating a sound or a voice. The control unit 14 is a component for controlling the whole communication terminal 10. To be more specific, the control unit 14 controls other components including the network communication unit 11, the TV-use communication unit 12, the audio input/output unit 13, the storage unit 15, the key input unit 16, the display unit 17 and the end-time acquisition unit 18. The storage unit 15 is a memory used for storing programs, voices, sounds, images, emails, waves and other user data. The storage unit 15 can be a memory embedded in the communication terminal 10 or an external memory such as a removable memory card. The key input unit 16 is a component comprising the ten keys, function keys and other buttons to be operated by the user for entering inputs to the communication terminal 10. The display unit 17 is a display screen such as a liquid crystal display screen for displaying an image of a received TV broadcast or a reproduced image. The display unit 17 may comprise a plurality of display screens including a main screen and a sub-screen. The end-time acquisition unit 18 is a component for acquiring the end time of an image or a program being watched. The end-time acquisition unit 18 may also be embedded in the control unit 14.

It is to be noted that the present invention is not limited to the configuration described above. For example, the network communication unit 11 and the TV-use communication unit 12 can also be integrated into a single module instead of being segregated into separated modules. By integrating the network communication unit 11 and the TV-use communication unit 12 into a single module, the communication terminal 10 can be downsized and its cost can hence be reduced.

Figure 2:
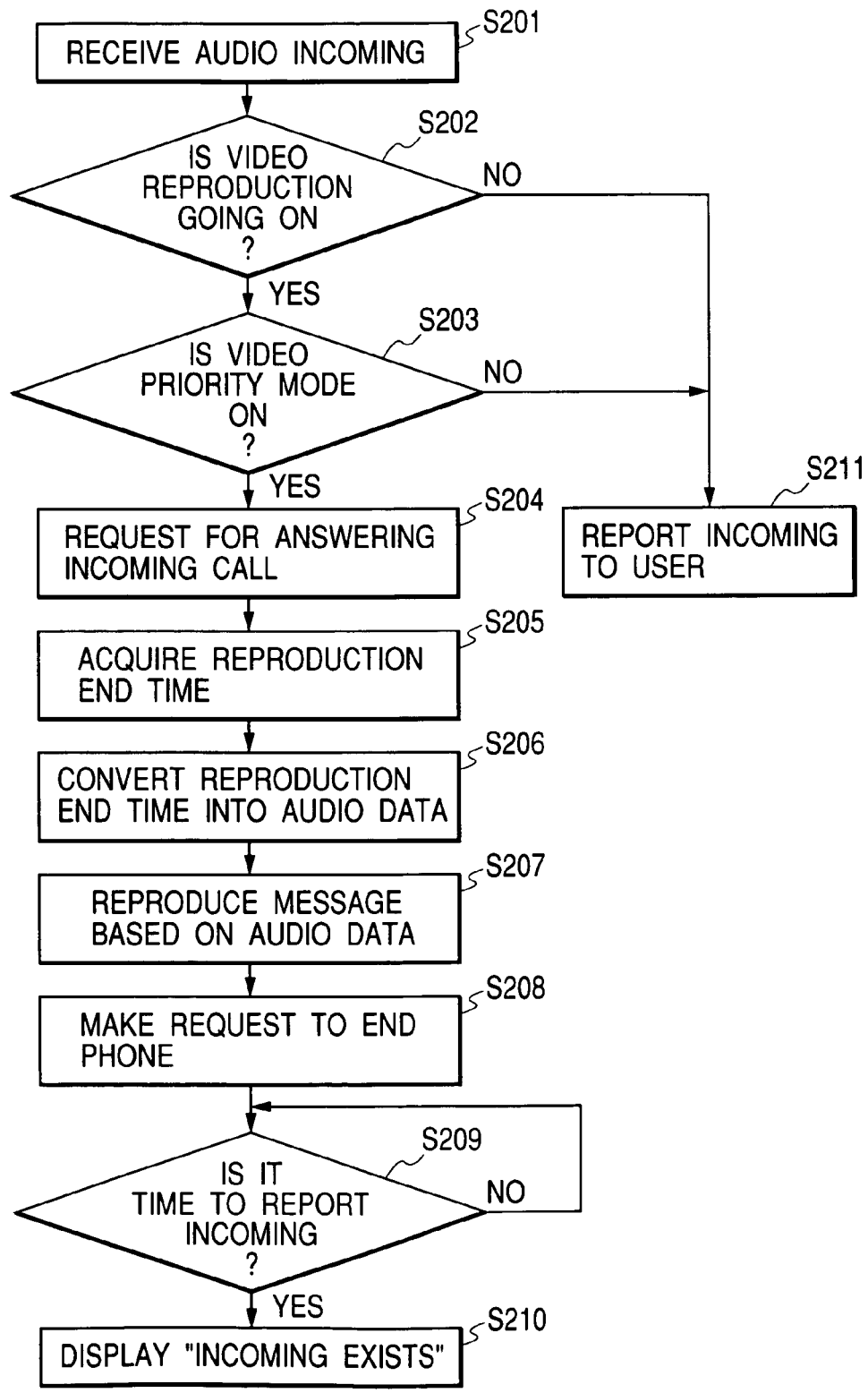
FIG. 2 shows a first flowchart representing a sequence of operations carried out to handle an incoming arriving in the course of a video reproduction.

FIG. 2 shows a first flowchart representing a sequence of operations carried out to handle an incoming arriving in the course of a video reproduction in the communication terminal 10 provided by the present invention. To put it concretely, the figure shows operations wherein, when an audio incoming arrives in the course of a video reproduction, the communication terminal 10 determines whether or not to report the incoming to the user on the basis of an incoming-reporting condition set in advance. If the incoming is not to be reported to the user, the end time of the video reproduction is transmitted to the phone-conversation partner as a response message. Steps of the operations are explained as follows.

(1) At a step S201, the network communication unit 11 detects an audio incoming. Then, at the next step S202, the control unit 14 determines whether or not a video reproduction is going on at the present time. If the control unit 14 determines that a video reproduction is going on at the present time, the flow of the operation sequence goes on to a step S203. If the control unit 14 determines that a video reproduction is not going on at the present time, on the other hand, the flow of the operation sequence goes on to a step S211 at which the incoming is reported to the user.

In this case, an on-going video reproduction also means an operation being carried out by the user to reproduce and display video information in some forms. The on-going video reproduction typically implies, among others, an on-going operation to display a currently broadcasted TV broadcast received by the TV-use communication unit 12, an on-going operation to reproduce video information, which was already broadcasted and recorded in advance, and an on-going operation to reproduce an image recorded by the user by using typically a camera embedded in the communication terminal 10. The TV broadcast can be a digital or analog broadcast. If information on the originator of an incoming is displayed or a sound is generated when the incoming is received while an image is being reproduced and displayed, a feeling of eye obstruction or a sense of ear obstruction cannot be avoided so that the user cannot concentrate the attention on the displayed image. Thus, the seeing and hearing of the image are obstructed. In this case, the information on the originator of an incoming includes the phone number of the incoming originator whereas an example of the generated sound is an incoming melody.

(2) As described above, if the determination result obtained at the step S202 indicates that a video reproduction is going on at the present time, the flow of the operation sequence goes on to the step S203 at which the control unit 14 checks an incoming-reporting condition stored in the storage unit 15 to determine whether the video reproduction takes precedence of an operation to report the incoming to the user or the operation to report the incoming takes precedence of the video reproduction on the basis of the setting of the incoming-reporting condition. If the control unit 14 determines that the video reproduction takes precedence of the operation to report the incoming to the user, the flow of the operation sequence goes on to a step S204. If the control unit 14 determines that the operation to report the incoming to the user takes precedence of the video reproduction, on the other hand, the flow of the operation sequence goes on to the step S211.

If an important telephone-conversation partner is set in advance as the incoming-reporting condition, for example, the operation to report an incoming phone call to the user takes precedence of the video reproduction if the incoming phone call is made by the important telephone-conversation partner. Otherwise, the video reproduction takes precedence of the operation to report the incoming phone call to the user and the incoming phone call is not reported, if the incoming phone call is made by a phone-call maker other than the important telephone-conversation partner. Thus, if an incoming phone call is received from an important phone-conversation partner, the operation to report the incoming phone call to the user takes precedence of the video reproduction so that the user can answer the phone immediately.

An important TV program can also be set in advance as the incoming-reporting condition so that the operation to reproduce and display the TV program takes precedence of the operation to report an incoming received while the TV program is being reproduced and displayed. In this case, the incoming is not reported to the user. If an incoming arrives while a TV program other than the important TV program is being reproduced and displayed, on the other hand, the operation to report the incoming to the user takes precedence of the operation to reproduce and display the other TV program so that the incoming is reported. Thus, the user can let the operation to reproduce and display an important TV program take precedence of the operation to report an incoming to the user so that the user can enjoy the program without an obstruction to the seeing and hearing of the program.

As incoming-reporting conditions, in addition to a phone-conversation partner and a TV program described above, it is possible to set a variety of conditions such as a reproduction date/time, a reproduction day of the week, a reproduction period of time, information on the position of the communication terminal 10, the movement speed of the communication terminal 10, the amount of electric charge remaining in the battery, video attributes, attributes of the telephone-conversation partner and attributes of the program.

For example, a program reproduced during a period of time on a day of the week or a date/time is a favorite drama, movie or the like. In this case, the communication terminal 10 can be used by having an incoming unreported to the user while the favorite drama, movie or the like is being watched during the period of time on the day of the week.

The information on the position of the communication terminal 10 can be obtained from typically a GPS. For example, the communication terminal 10 can be utilized in such a way that, when the communication terminal 10 is used at home, an incoming is always reported to the user since the user can watch a TV program by using an ordinary home TV but, when the communication terminal 10 is used at an outdoor location, on the other hand, an incoming is not reported.

The movement speed of the communication terminal 10 can be found from the positions obtained periodically from the GPS each as the present position of the communication terminal 10. If the movement speed of the communication terminal 10 is at least equal to a predetermined value, the communication terminal 10 determines that the user is currently on board of a public transport facility or driving its own car. In this case, an incoming is not reported to the user since, if an incoming is reported, surrounding passengers in the public transport facility will be disturbed or the safety of the user driving its own car will be at stake. The communication terminal 10 can also be used in such a way that, when the user is on board of a train moving along a railway, the user is allowed to watch a TV program but, when the user is moving along an ordinary road at at least a predetermined speed, on the other hand, neither an incoming is reported to the user nor a TV program can be watched for the sake of safety since the user is determined to be driving a car by itself.

The communication terminal 10 can be used in such a way that, when the amount of electric charge remaining in the battery is small, an incoming is not reported to the user in order to consume the little electric charge remaining in the battery more economically.

With regard to the video attributes, the communication terminal 10 can be used in such a way that, if the image being reproduced is an already recorded image, an incoming is reported to the user since the reproduction of such an image can be suspended temporarily and resumed later to allow the user to watch the rest but, if the image being reproduced is a current TV broadcast, on the other hand, an incoming is not reported because an interrupted portion of the TV broadcast cannot be watched later.

In regard to the attributes of the phone-conservation partner, the communication terminal 10 can be used in such a way that, if the phone-conservation partner is cataloged as a person doing businesses with the user, the phone-conservation partner is regarded as such an important person that an incoming phone call made by the phone-conservation partner is reported to the user. With regard to the video attributes of a program, the communication terminal 10 can be used in such a way that, if the program is a movie, an incoming is not reported to the user so as to prevent the seeing and hearing of the movie from being interrupted.

In addition, the incoming-reporting conditions described above can be set as a combination. For example, phone-conversation partners are categorized into customers and friends whereas days of the week are classified into weekdays and holidays. In this case, the communication terminal 10 can be used in such a way that, when a phone call is received on a day from a customer, the incoming phone call is reported to the user without regard to whether the day is a weekday or a holiday but, if a phone call is received on a day from a friend, on the other hand, the incoming phone call is not reported to the user if the day is a weekday but reported if the day is a holiday. By allowing a variety of incoming-reporting conditions to be set in this way, the user can have various kinds of setting for the incoming-reporting condition as the user desires.

(3) As described above, if the control unit 14 determines at the step S203 that the video reproduction takes precedence of the operation to report the incoming to the user, the flow of the operation sequence goes on to the step S204 at which the control unit 14 controls the network communication unit 11 to transmit an incoming response request. This incoming response request is a request to connect the communication terminal 10 to the communication terminal of the phone-conversation partner through a network. With the communication terminal 10 connected to the communication terminal used by the phone-conversation partner, operations can be carried out at the subsequent steps to notify the phone-conservation partner of the program end time to be described later. It is to be noted that operations of the steps S204 to S208 are carried out in a background mode not obstructing the video seeing and hearing carried out by the user to watch an image.

(4) As described above, the incoming response request is transmitted to connect the communication terminal 10 to the communication terminal of the phone-conversation partner through the network at the step S204. Then, at the next step S205, the end-time acquisition unit 18 acquires the reproduction end time of the present video reproduction. For example, the reproduction end time can be picked up from end times of programs included in broadcasted data of a digital broadcast, obtained from a server providing programs or fetched from typically a program table downloaded in advance by using an EPG function or the like. In the case of a reproduction of an image recorded in advance, the reproduction end time can be found from the recording length of the image.

As explained above, the reproduction end time is acquired after the incoming response request is transmitted. It is to be noted that, the reproduction end time can also be acquired before the incoming response request is transmitted.

(5) After the reproduction end time is acquired at the step S205, the control unit 14 converts the reproduction end time into audio data and creates a message including the audio data as a response message to be transmitted to the phone-conversation partner at the next step S206. As an example, the response message states: "The person you called is currently watching a TV program and, thus, cannot answer the telephone. Please, make a phone call again later at a time not earlier than XX minutes past OO." The "XX minutes past OO" is the audio data obtained as a result of the conversion of the acquired reproduction end time. The response message can thus be created by synthesizing the audio data with the rest of the message. The audio data of the rest of the response message has been stored in the storage unit 15 in advance. In this case, the audio data of the rest of the response message states: "The person you called is currently watching a TV program and, thus, cannot answer the telephone. Please, make a phone call again later at a time not earlier than . . . ."

The response message can also simply states: "Please, make a phone call again later at a time not earlier than XX minutes past OO" without informing the phone-conversation partner that the called person is currently watching a TV program and, thus, cannot answer the telephone.

(6) After the audio data of the response message is created at the step S206, the control unit 14 reproduces a response message based on the audio data and transmits the message to the communication terminal of the phone-conversation partner by way of the network communication unit 11 at the next step S207. The response message is reproduced by executing typically an answer-phone function. As the transmission of the response message is ended, a request for a phone termination is transmitted to cut off the line at the next step S208.

(7) After the processing of the step S208 is ended, at the next step S209, the control unit 14 determines a timing to inform the user of the arrival of the incoming. For example, when the control unit 14 detects a CM image replacing a TV image at the next step S210, the control unit 14 displays a message on the display unit 17 to inform the user that the incoming has been received. In addition, the timing to report an incoming to the user does not have to be detection of a CM image replacing a TV image. For example, an incoming can also be reported to the user when the user turns off the TV function, changes the channel number, stops the video reproduction or suspends the video reproduction by typically carrying out an operation to enter an input to the communication terminal 10.

Figure 9:
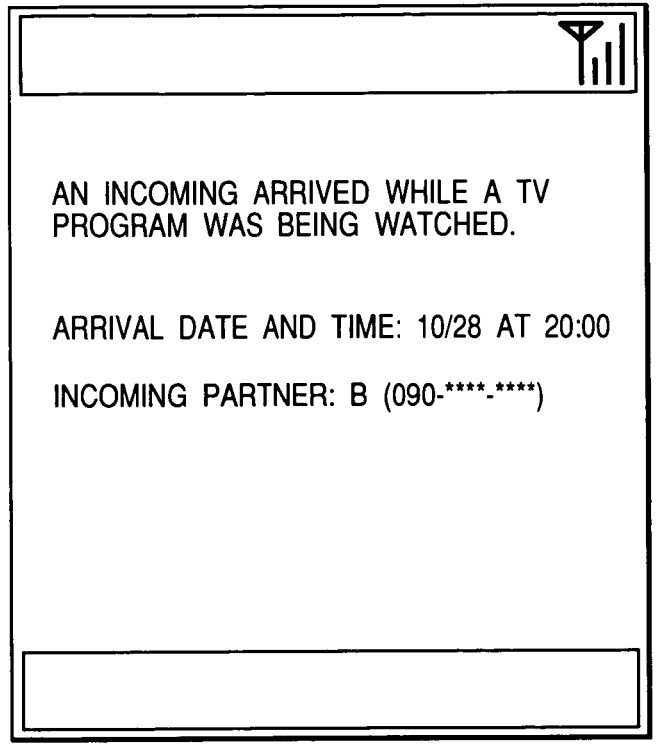
FIG. 9 is a diagram showing a screen appearing on a display unit to reveal the arrival of an incoming in the course of watching a TV program.

An incoming can be reported to the user by typically displaying a message on the display unit 17. The message may state: "An incoming arrived while a TV program was being watched" like one shown in FIG. 9. In this case, the message may include information such as the time and date of the arrival of the incoming, the originator of the incoming and the phone number and email address of the originator. Such information tells the user when the incoming arrived, and allows the user to confirm the phone number and email address of the originator of the incoming as well as make a phone call or send an email in response to the incoming immediately.

The above description has explained a sequence of operations to determine whether or not to report an incoming phone call to the user in accordance with incoming-reporting conditions set in advance and, if the incoming phone call is not to be reported, a message indicating the end time of a program is transmitted to the phone-conversation partner originating the incoming call.

It is to be noted that, while the above processing is described for an audio incoming, the processing also applies to an incoming email. For example, the communication terminal 10 is used in such a way that, if a video reproduction is going on when an incoming email is received, the control unit 14 checks an incoming-reporting condition stored in the storage unit 15 to determine whether the video reproduction takes precedence of an operation to report the incoming email to the user or the operation to report the incoming email takes precedence of the video reproduction on the basis of the setting of the incoming-reporting condition such as an incoming-reporting condition set to indicate whether or not the email sender is important. If the control unit 14 determines that the video reproduction takes precedence of the operation to report the incoming email to the user, the video reproduction is continued. If the control unit 14 determines that the operation to report the incoming email to the user takes precedence of the video reproduction, on the other hand, the incoming email is reported.

Figure 6:
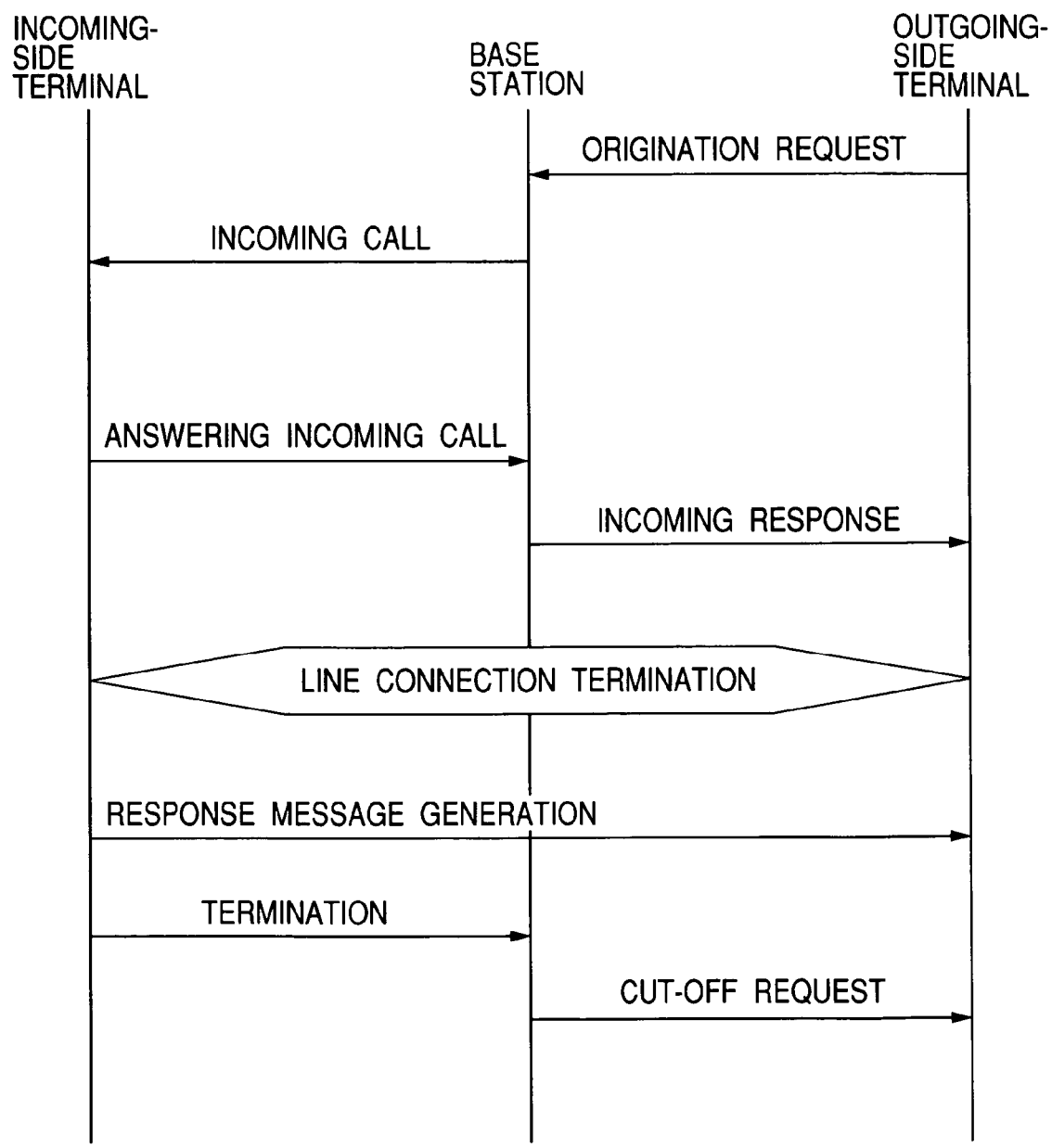
FIG. 6 is a diagram showing a first sequence of operations carried out by an incoming-side terminal, an outgoing-side terminal and a base station.

In the sequence of operations shown in FIG. 2, the incoming-side terminal, the outgoing-side terminal and the base station carry out operations as shown in FIG. 6. To put it in detail, when the outgoing-side terminal makes an origination request, a incoming call is transmitted to the incoming-side terminal by way of the base station. If a video reproduction is going on and takes precedence of the operation to report the incoming email to the user in the incoming-side terminal, the incoming-side terminal transmits an answering incoming call to the outgoing-side terminal by way of the base station. As this incoming response completes a line connection, the incoming-side terminal reproduces and transmits a response message showing the end time of the video reproduction to the outgoing-side terminal. After the response message is reproduced and transmitted, the incoming-side terminal transmits a termination to the outgoing-side terminal by way of the base station as a request reporting a termination of the line connection, and cuts off the line connection.

Figure 3:
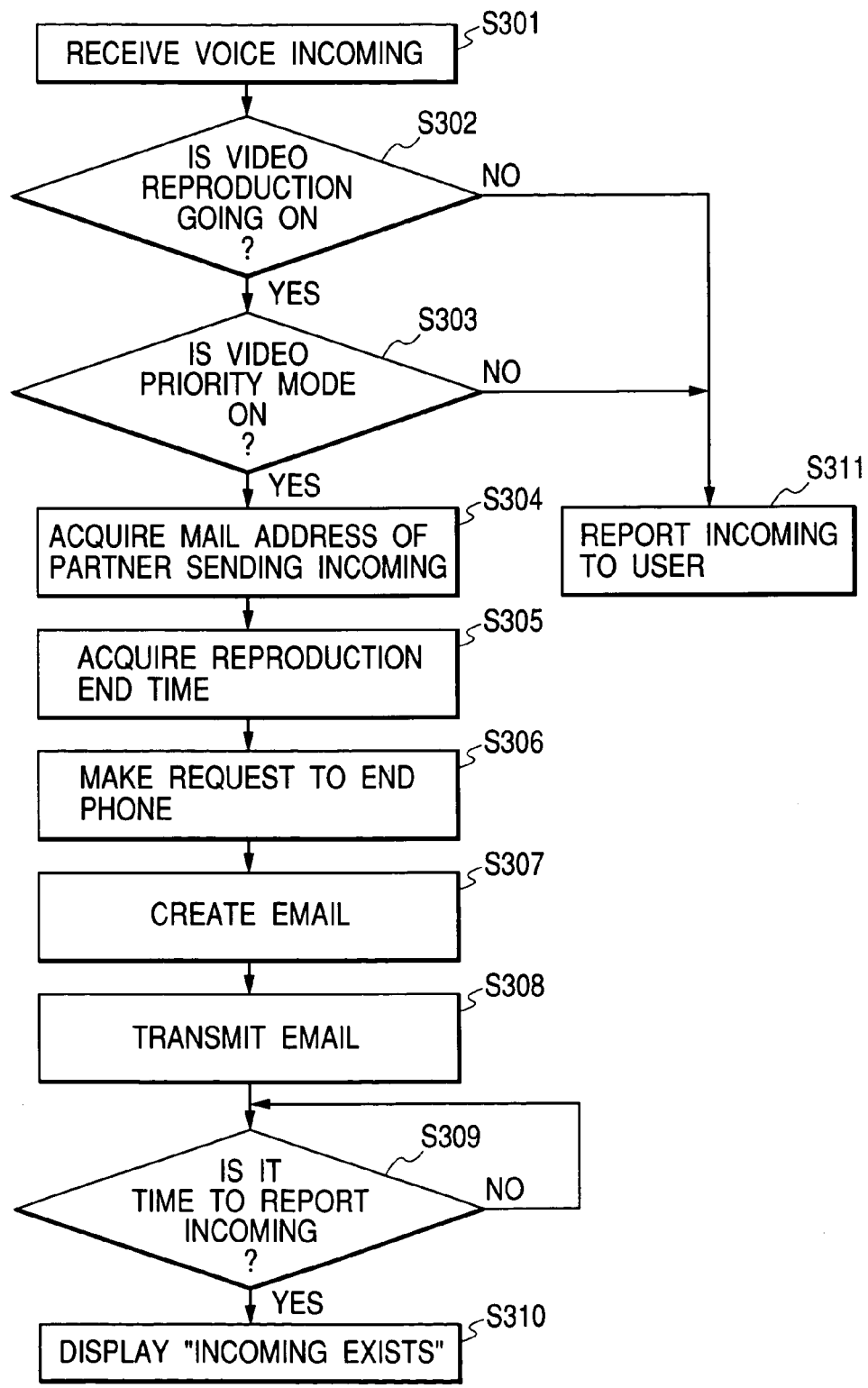
FIG. 3 shows a second flowchart representing a sequence of operations carried out to handle an incoming arriving in the course of a video reproduction.

Next, another sequence of operations is explained by referring to FIG. 3. FIG. 3 shows a flowchart representing a sequence of operations carried out to handle an voice incoming received in the course of a video reproduction. To put it concretely, in the operations shown in the figure, when an voice incoming is received in the course of a video reproduction, an incoming-reporting condition set in advance is used as a basis for determining whether or not the incoming is to be reported to the user. If the voice incoming is not to be reported to the user, an email showing the end time of the video reproduction is sent to the phone-conversation partner. The sequence of operations shown in FIG. 3 is different from the sequence of operations shown in FIG. 2 in that, in the case of the sequence of operations shown in FIG. 2, the end time of the video reproduction is indicated in a message response while, in the case of the sequence of operations shown in FIG. 2, the end time of the video reproduction is indicated in an email. Operations carried out at steps of the sequence of operations shown in FIG. 3 are explained as follows.

(1) At a step S301, the network communication unit 11 detects an voice incoming. Then, at the next step S302, the control unit 14 determines whether or not a video reproduction is going on at the present time. If the control unit 14 determines that a video reproduction is going on at the present time, the flow of the operation sequence goes on to a step S303. If the control unit 14 determines that a video reproduction is not going on at the present time, on the other hand, the flow of the operation sequence goes on to a step S311 at which the incoming is reported to the user.

In this case, an on-going video reproduction also means an operation being carried out by the user to reproduce and display video information in some forms in the communication terminal 10 as is the case with the sequence of operations shown in FIG. 2.

(2) As described above, if the determination result obtained at the step S302 indicates that a video reproduction is going on at the present time, the flow of the operation sequence goes on to the step S303 at which the control unit 14 checks an incoming-reporting condition stored in the storage unit 15 to determine whether the video reproduction takes precedence of an operation to report the incoming to the user or the operation to report the incoming takes precedence of the video reproduction on the basis of the setting of the incoming-reporting condition. If the control unit 14 determines that the video reproduction takes precedence of the operation to report the incoming to the user, the flow of the operation sequence goes on to a step S304. If the control unit 14 determines that the operation to report the incoming to the user takes precedence of the video reproduction, on the other hand, the flow of the operation sequence goes on to the step S311. Much like the sequence of operations shown in FIG. 2, a variety of incoming-reporting conditions can be set.

(3) As described above, if the control unit 14 determines at the step S303 that the video reproduction takes precedence of the operation to report the incoming to the user, the flow of the operation sequence goes on to the step S304 at which the control unit 14 acquires the email address of the phone-conversation partner. If the phone number of the phone-conversation partner can be used as the email address, the phone number included in the incoming is used as it is. If the email address of the phone-conversation partner has been cataloged on an address list stored in the storage unit 15, the email address is fetched from the list. It is to be noted that operations of the steps S304 to S308 are carried out in a background mode not obstructing the video seeing and hearing carried out by the user to watch the image.

(4) After the email address of the phone-conversation partner is acquired at the step S304, at the next step S305, the control unit 14 acquires the reproduction end time of the present video reproduction. The reproduction end time of the present video reproduction can be acquired by adoption of the same technique as the sequence of operations shown in FIG. 2.

As explained above, the reproduction end time is acquired after the incoming response request is transmitted. It is to be noted that, the reproduction end time can also be acquired before the incoming response request is transmitted.

(5) After the reproduction end time is acquired at the step S305, the control unit 14 transmits a request for an end of the call session to the originator of the sound incoming by way of the network 11 at the next step 306.

(6) As the line is cut off by the transmitted request for an end of the call session at the step S306, the control unit 14 starts to create an email informing the phone-conversation partner of the video-reproduction end time at the next step S307. Information on the video-reproduction end time acquired at the step S305 is included typically in the main body or title of the email. An example of the main body states: "The person you called is currently watching a TV program and, thus, cannot answer the telephone. Please, make a phone call again later at a time not earlier than XX minutes past OO." The "XX minutes past OO" is data based on information on the acquired end time of the video reproduction. The main body of the email can thus be created by embedding the data based on the information on the acquired end time of the video reproduction into the rest of the main body of the email. The rest of the main body of the email is a fixed phrase already stored in the storage unit 15 in advance. In this case, the fixed phrase of the rest of the main body of the email states: "The person you called is currently watching a TV program and, thus, cannot answer the telephone. Please, make a phone call again later at a time not earlier than."

The main body of the email can also simply states: "Please, make a phone call again later at a time not earlier than XX minutes past OO" without informing the phone-conversation partner that the called person is currently watching a TV program and, thus, cannot answer the telephone.

(7) After the email is written at the step S307, the control unit 14 transmits the email to the communication terminal of the phone-conversation partner by way of the network communication unit 11 at the next step S308.

Figure 10:
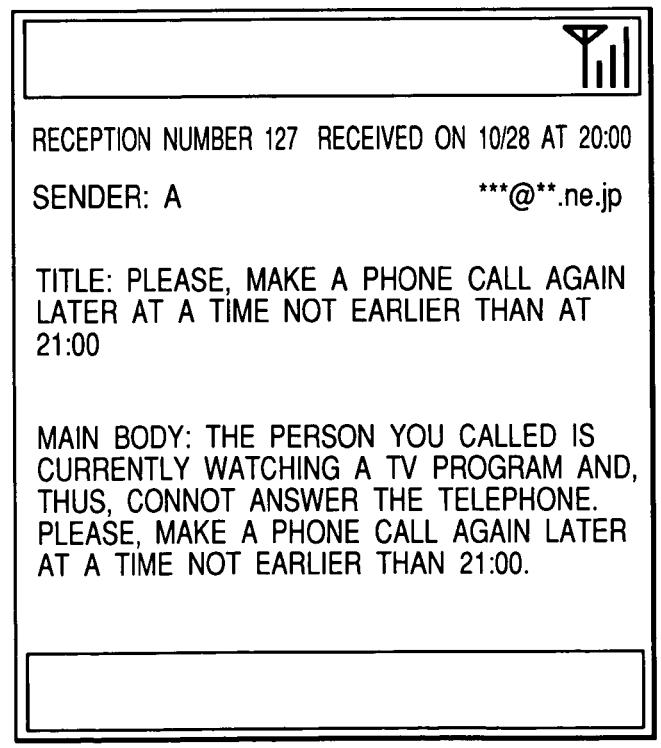
FIG. 10 is a diagram showing a screen appearing on a display unit to reveal an email received by a phone-conversation partner.

The email sent to the phone-conversation partner is displayed on the display unit employed in the communication terminal of the phone-conversation partner as a message like one shown in FIG. 10. In this message, the phrase stating: "Please, make a phone call again later at a time not earlier than 21:00" is included in both the title and main body of the email, informing the phone-conversation partner of when a next phone call can be made. In addition, information such as the reception date and time of the email, the sender of the email as well as the phone number and email address of the sender can also be shown in the message. The information tells the phone-conversation partner the reception date and time of the email and allows the partner to confirm the phone number and email address of the sender of the email.

(8) After the processing of the step S308 is ended, at the next step S309, the control unit 14 determines a timing to inform the user of the arrival of the incoming. For example, when the control unit 14 detects a CM image replacing a TV image at the next step S310, the control unit 14 displays a message on the display unit 17 to inform the user that the incoming has been received. Much like the sequence of operations shown in FIG. 2, the incoming can be reported to the user with a variety of timings.

Figure 11:
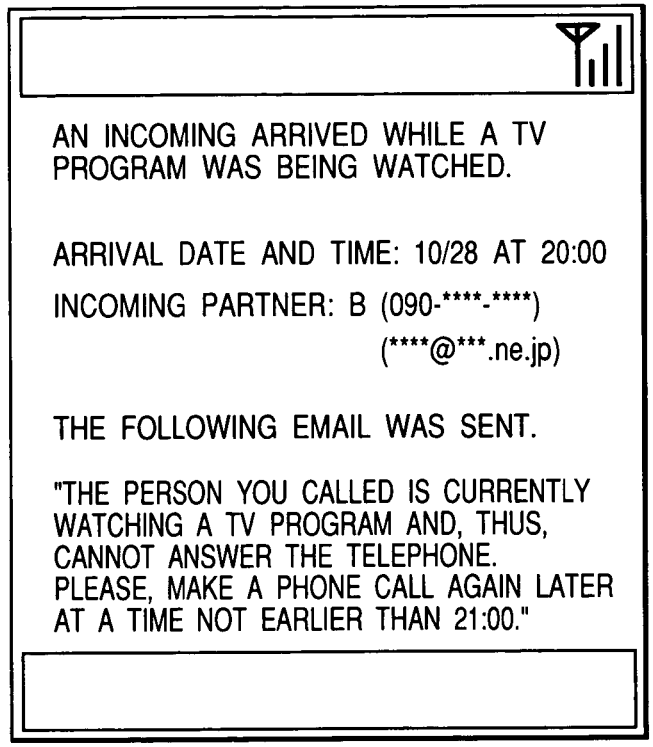
FIG. 11 is a diagram showing a screen appearing on a display unit to reveal the fact that an email has been transmitted to a phone-conversation partner.

It is to be noted that, since a transmission of an email costs money, it is desirable to also information the user that an email has been transmitted to the phone-conversation partner by displaying a message on the display unit 17. Thus, a message like one shown in FIG. 11 is displayed on the display unit 17 to notify the user that an incoming arrived while the user was watching a TV program and that an email has been transmitted to the phone-conversation partner. The message may state: "An incoming arrived while a TV program was being watched," and include the contents of the email sent to the phone-conversation partner. In this case, the message may include information such as the time and date of the arrival of the incoming, the originator of the incoming and the phone number and email address of the originator. Such information tells the user when the incoming arrived, and allows the user to confirm the phone number and email address of the originator of the incoming and make a phone call or send an email in response to the incoming immediately. It is to be noted that, while the message displayed on a single screen as shown in FIG. 11 notifies the user that an incoming arrived while the user was watching a TV program and that an email has been transmitted to the phone-conversation partner, the message does not have to be displayed in this way. For example, first, a message is displayed on a screen to notify the user of only the fact that an incoming arrived while the user was watching a TV program. Then, when the user carries out an operation by pressing a button, for example, the screen is replaced by a message notifying the user that an email has been transmitted to the phone-conversation partner. Since the message is split into 2 screens, it is possible to reduce complexity of the screen as complexity caused by difficult-to-read small characters appearing on the display unit 17 due to the fact that a large number of characters must be displayed on a screen at one time.

If an email address cannot be acquired at the step S304, an email cannot be sent. In this case, a response message is generated to inform the phone-conversation partner of the video-reproduction end time. In this case, the flow of the operation sequence typically continues from the step S304 to the step S204 of the flowchart shown in FIG. 2. Then, the operations of the steps S204 to S208 are carried out to generate the response message. In this way, it is possible to inform the phone-conversation partner of the video-reproduction end time.

The above description has explained a sequence of operations to determine whether or not to report an incoming phone call to the user in accordance with incoming-reporting conditions set in advance and, if the incoming phone call is not to be reported, an email indicating the end time of a program is transmitted to the phone-conversation partner originating the incoming call.

It is to be noted that, while the above processing is described for an voice incoming, the processing also applies to an incoming email. For example, the communication terminal 10 is used in such a way that, if a video reproduction is going on when an incoming email is received, the control unit 14 checks an incoming-reporting condition stored in the storage unit 15 to determine whether the video reproduction takes precedence of an operation to report the incoming email to the user or the operation to report the incoming email takes precedence of the video reproduction on the basis of the setting of the incoming-reporting condition such as an incoming-reporting condition set to indicate whether or not the email sender is important. If the control unit 14 determines that the video reproduction takes precedence of the operation to report the incoming email to the user, the video reproduction is continued. If the control unit 14 determines that the operation to report the incoming email to the user takes precedence of the video reproduction, on the other hand, the incoming email is reported.

Figure 7:
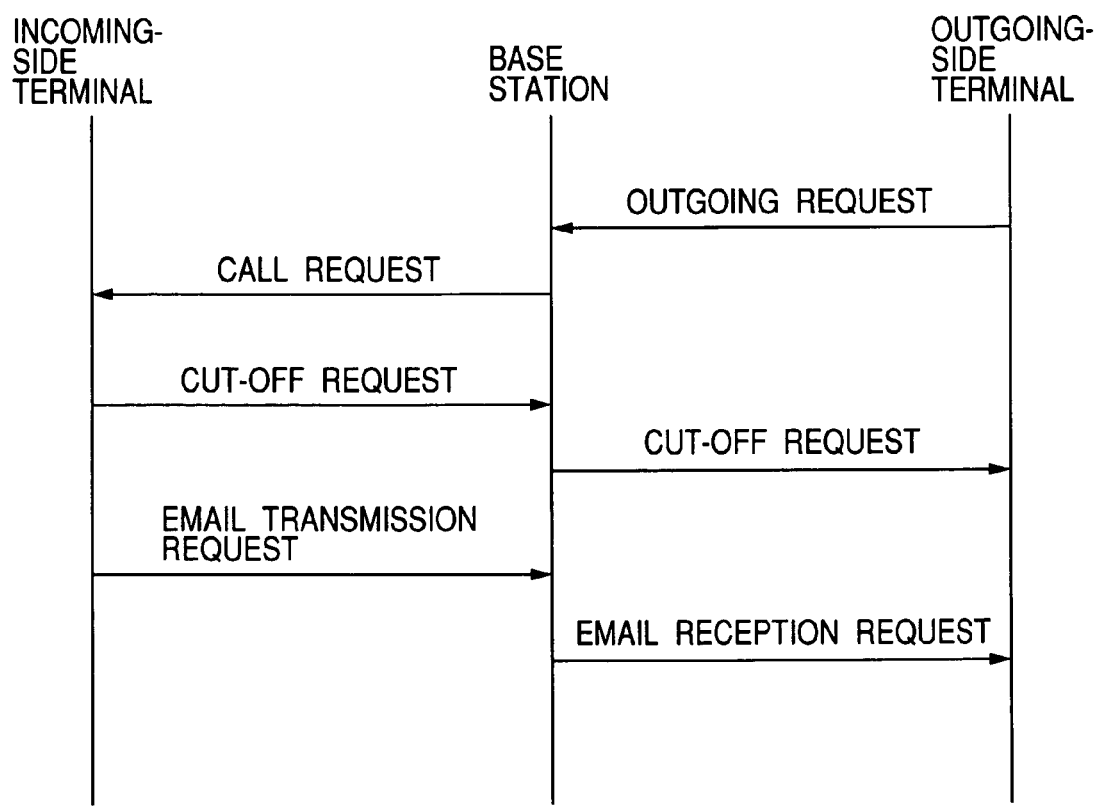
FIG. 7 is a diagram showing a second sequence of operations carried out by an incoming-side terminal, an outgoing-side terminal and a base station.

In the sequence of operations shown in FIG. 3, the incoming-side terminal, the outgoing-side terminal and the base station carry out operations as shown in FIG. 7. To put it in detail, when the outgoing-side terminal makes an outgoing request, a call request is transmitted to the incoming-side terminal by way of the base station. If a video reproduction is going on and takes precedence of the operation to report the voice incoming to the user in the incoming-side terminal, the incoming-side terminal makes a request to cut off the transmission line and the incoming-side terminal informs the outgoing-side terminal through the base station that the transmission line has been cut off. After the transmission line is cut off, the incoming-side terminal makes a request to transmit an email notifying the outgoing-side terminal of a video-reproduction end time. Then, the outgoing-side terminal sets a line connection with the base station (a server) to transmit an acknowledgment of the received email to the incoming-side terminal. It is to be noted that, in this case, there are actually two conceivable cases. In one of the cases, the base station merely passes on the email itself to the outgoing-side terminal. In the other case, the base station gives an acknowledgment of the email to the incoming-side terminal and, later on, the outgoing-side terminal sets a line connection with the base station (a server) to receive the email.

By referring to the flowcharts shown in FIGS. 2 and 3, the above description has explained processing carried out to handle an incoming received in the course of a video reproduction. By carrying out the processing, the user can receive a report of an incoming even in the course of a video reproduction in dependence on the importance of the incoming relative to the video reproduction. If the incoming phone call is made by an important partner so that the operation to report the incoming phone call to the user is more significant than the continuation of the video reproduction, for example, the user can answer the telephone. If the incoming phone call is made by a less important partner so that the operation to report the incoming phone call to the user is less significant than the continuation of the video reproduction, on the other hand, the operation to report the incoming phone call does not take precedence of the continuation of the video reproduction. In this case, the user can enjoy the watching of the program by concentrating attention to the program. Thus, the communication terminal can be used with a higher degree of convenience. In addition, the phone-conversation partner is informed of a particular time after which a phone call will be accepted. Thus, it is no longer necessary for the phone-conversation partner to make a phone call several times before the particular time. As a result, troublesomeness can be eliminated. In addition, since a phone call can be made right after the video reproduction is ended, the phone-conversation partner can contact the user at the end of the video reproduction.

Note that it is desirable to provide a feature allowing the user to determine whether the phone-conversation partner is to be notified of the end of video reproduction by using a response message in the sequence of operations shown in FIG. 2 or an email in the sequence of operations shown in FIG. 3. For example, it is desirable to allow the user to select either a response message or an email in an operation to set incoming-reporting conditions. In this way, the phone-conversation partner can be notified of the end of video reproduction by adoption of a technique desired by the user. Thus, the communication terminal can be used with a higher degree of convenience.

Next, a method of setting incoming-reporting conditions is explained by referring to FIG. 4.

FIG. 4 is a diagram showing a typical table typically summarizing concrete incoming-reporting conditions. The table of incoming-reporting conditions is stored in the storage unit 15 as described above.

Each record of the table of incoming-reporting conditions comprises a sequence number 401, a video priority mode 402 and criteria 403. The sequence number 401 is a number indicating an order in an operation to search the table of incoming-reporting conditions for a record. When an incoming is received in the course of a video reproduction, the table of incoming-reporting conditions is searched sequentially in an order indicated by the sequence numbers 401 starting from the number 1 for a record corresponding to the incoming. The video priority mode 402 is used for storing information, which can be ON or OFF. With the video priority mode 402 set at ON in a record found in a sequential search carried out in an order indicated by the sequence numbers 401 on the table of incoming-reporting conditions, the video reproduction takes precedence of the operation to report an incoming to the user without regard to the importance of the phone-conversation partner and the importance of the image being reproduced. With the video priority mode 402 set at OFF in a record found in a sequential search carried out in an order indicated by the sequence numbers 401 on the table of incoming-reporting conditions, on the other hand, the criteria 403 of the record are examined to determine whether the video reproduction takes precedence of the operation to report an incoming to the user or the operation to report an incoming takes precedence of the video reproduction. Examples of the incoming-reporting condition include information such as "The partner making the phone call is a person named A," "The name of the program being watched presently is B," "The email sender is a person named C" and "The time period is 18:00 to 7:00."

It is to be noted that there are 3 types of criterion for each record. The number of criteria per record is arbitrary as long as there are more than one criterion in one record. In addition, as criteria, it is possible to set a variety of conditions such as a reproduction date, a reproduction day of the week, a reproduction period of time, information on the position of the communication terminal 10, the movement speed of the communication terminal 10, the amount of electric charge remaining in the battery, video attributes, attributes of the telephone-conversation partner and attributes of the program.

As described above, the table of incoming-reporting conditions is used for setting a variety of conditions. In this way, the user is allowed to set incoming-reporting conditions desired by the user.

Figure 5:
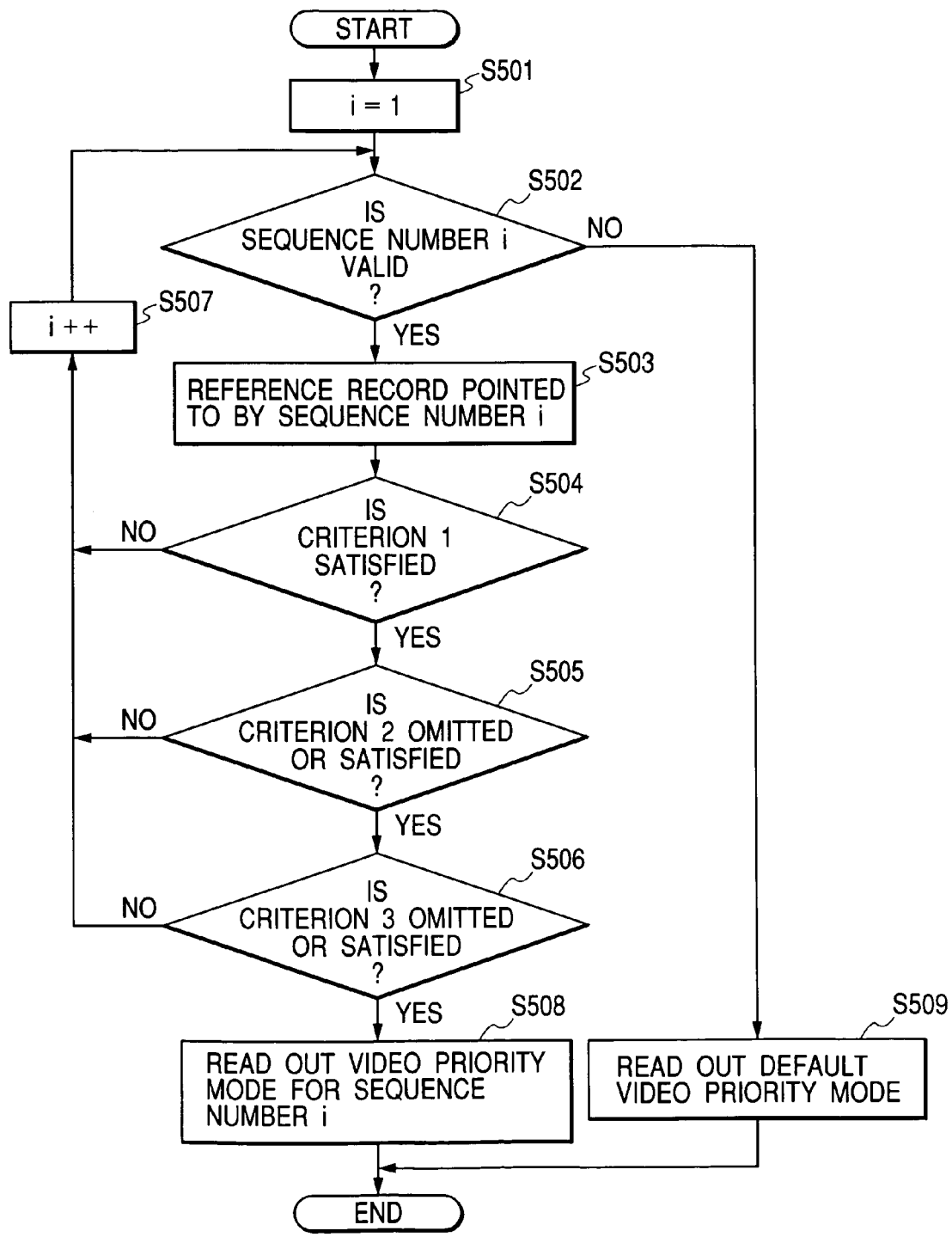
FIG. 5 shows a flowchart representing a procedure for referencing the table of incoming-reporting conditions.

By referring to the flowchart shown in FIG. 5, the following description explains the procedure executed at the steps S203 and S303 to determine the value of the priority mode.

(1) First of all, at the first step S501, the value of the sequence number i showing the order of the operation to search the table of incoming-reporting conditions for a record is set at 1 corresponding to the first non-default record in the table.

(2) Then, at the next step S502, the sequence number i is examined to determine whether or not the sequence number i is valid, that is, to determine whether or not the sequence number i points to a record in the table of incoming-reporting conditions. If the determination result obtained at the step S502 is YES meaning that the sequence number i is valid, the flow of the procedure goes on to a step S503.

If the determination result obtained at the step S502 is NO meaning that the sequence number i is invalid, on the other hand, the flow of the procedure goes on to a step S509 at which a default priority mode is read out from the table of incoming-reporting conditions and the execution of the procedure is ended. In the typical table shown in FIG. 4 as the table of incoming-reporting conditions, the value of the video priority mode 402 in a record pointed to by the sequence number * is the default priority mode. Thus, in this case, an ON value of the video priority mode 402 is read out from the table of incoming-reporting conditions and the video reproduction takes precedence of the operation to report an incoming to the user.

(3) If the sequence number i is determined to be a valid sequence number, the flow of the procedure goes on to a step S504 by way of the step S503 at which a record pointed to by the sequence number i is referred to.

(4) At the step S504, the record is examined to determine whether or not criterion 1 is satisfied. If the determination result obtained at the step S504 is YES meaning that criterion 1 is satisfied, the flow of the procedure goes on to a step S505. If the determination result obtained at the step S504 is NO meaning that criterion 1 is not satisfied, on the other hand, the flow of the procedure goes on to a step S507 at which the sequence number i is incremented by 1. Then, the flow of the procedure goes back to the step S502.

As an example, the following description explains the criterion of a record included in the incoming-reporting condition table shown in FIG. 4 as a record pointed to by the sequence number 1. Criterion 1 in the record pointed to by the sequence number 1 states: "The partner making the phone call is a person named A." Thus, if the phone-conversation partner of the voice incoming is a person named A, criterion 1 is satisfied. In this case, the flow of the procedure goes on to the step S505. If the phone-conversation partner of the voice incoming is not a person named A, on the other hand, criterion 1 is not satisfied. In this case, the flow of the procedure goes on to the step S507 at which the sequence number i is incremented by 1. Then, the flow of the procedure goes back to the step S502.

(5) If criterion 1 is determined to be a satisfied condition, the flow of the procedure goes on to a step S505 to determine whether or not the record includes criterion 2 and, if the record includes criterion 2, determine whether or not criterion condition 2 is satisfied. If the determination result obtained at the step S505 is YES meaning that criterion 2 is not described in the record or criterion 2 is satisfied, the flow of the procedure goes on to a step S506.

If the determination result obtained at the step S505 is NO meaning that criterion 2 described in the record is not satisfied, on the other hand, the flow of the procedure goes on to the step S507 at which the sequence number i is incremented by 1. Then, the flow of the procedure goes back to the step S502.

Criterion 2 is not described in a record included in the incoming-reporting condition table shown in FIG. 4 as the record pointed to by the sequence number 1. Thus, in this case, the flow of the procedure goes on to the step S506.

(6) If the record does not include criterion 2, the non-existence of criterion 2 is interpreted as satisfied criterion 2. In this case, the flow of the procedure goes on to the step S506 as described above to determine whether or not the record includes criterion 3 and, if the record includes criterion 3, determine whether or not criterion condition 3 is satisfied. If the determination result obtained at the step S506 is YES meaning that criterion 3 is not described in the record or if criterion 3 is satisfied, the flow of the procedure goes on to a step S508.

If the determination result obtained at the step S506 is NO meaning that criterion 3 described in the record is not satisfied, on the other hand, the flow of the procedure goes on to the step S507 at which the sequence number i is incremented by 1. Then, the flow of the procedure goes back to the step S502.

Criterion 3 is not described in a record included in the incoming-reporting condition table shown in FIG. 4 as the record pointed to by the sequence number 1. Thus, in this case, the flow of the procedure goes on to the step 3508.

(7) If the record does not include criterion 3, the non-existence of criterion 3 is interpreted as satisfied criterion 3. In this case, the flow of the procedure goes on to the step S508 at which the video priority mode of the record pointed to by the sequence number i is read out from the table of incoming-reporting conditions.

In the case of the sequence number 1 for the incoming-reporting condition table shown in FIG. 4, as a result of the operations carried out the steps S502 to S507, the flow of the procedure goes on to the step S508 if the phone-conversation partner is a person named A, or goes on to a step S509 if the phone-conversation partner is not a person named A. That is to say, if the phone-conversation partner is a person named A, the OFF value of the video priority mode is read out from the record pointed to by the sequence number 1. In this case, the incoming is reported to the user. If the phone-conversation partner is not a person named A, on the other hand, the ON default value of the video priority mode is read out from the record pointed to by the sequence number *. In this case, the video reproduction takes precedence of the operation to report an incoming to the user. Thus, the incoming is not reported to the user.

By the same token, in the case of the sequence number 2, an incoming is reported to the user if the program being watched is program B and not reported to the user if the program being watched is not program B. As for the sequence number 3, an incoming is reported to the user if the email sender is a person named C and the incoming is received in a time period of 18:00 to 7:00. Otherwise, the incoming is not reported to the user. As for the sequence number 4, an incoming is reported to the user if the phone-conversation partner is a person named D, the program being watched is program E and the incoming is received in a time period of 20:00 to 22:00. Otherwise, the incoming is not reported to the user.

As described above, criteria are examined sequentially from sequence number i to another in order to determine whether or not the criteria described in a record pointed to by a sequence number i are satisfied. If all the criteria described in a record pointed to by a sequence number i are satisfied, the value of the video priority mode is read out from the record pointed to by the sequence number i. The value read out from the record is then used as a basis for determining whether the video reproduction takes precedence of the operation to report an incoming to the user or the operation to report an incoming takes precedence of the video reproduction. If all the criteria described in every record are not satisfied, on the other hand, the default value of the video reproduction mode is used. In the case of the typical default value set in the table of incoming-reporting conditions, the video reproduction is continued without reporting the incoming to the user.

In accordance with the incoming-reporting condition table shown in FIG. 4 and the procedure represented by the flowchart shown in FIG. 5, a non-default value of the video priority mode is read out from a record identified by a sequence number only if, for the record, criterion 1 is satisfied AND criterion 2 is satisfied AND criterion 3 is satisfied, that is, a logic expression of Criterion 1*Criterion 2 *Criterion 3 has a true Boolean value. However, a non-default value of the video priority mode can also be read out from a record only if, for the record, criterion 1 is satisfied OR criterion 2 is satisfied OR criterion 3 is satisfied. As another alternative, a non-default value of the video priority mode is read out from a record only if, for the record, criterion 1 is NOT satisfied AND/OR criterion 2 is NOT satisfied AND/OR criterion 3 is NOT satisfied. In addition, in accordance with the incoming-reporting condition table shown in FIG. 4 and the procedure represented by the flowchart shown in FIG. 5, only 3 criteria are prescribed. However, the present invention is not limited to the configuration prescribing only 3 criteria. Also in accordance with the incoming-reporting condition table shown in FIG. 4 and the procedure represented by the flowchart shown in FIG. 5, the default value of the video priority mode is set at ON. However, the default value of the video priority mode can also be set at OFF.

Another table of incoming-reporting conditions is explained by referring to FIG. 8 as follows. FIG. 8 is a diagram showing a second typical incoming-reporting condition table, which is obtained by extending the typical incoming-reporting condition table shown in FIG. 4. The incoming-reporting condition table shown in FIG. 8 is different from the incoming-reporting condition table shown in FIG. 4 in that, in the case of the incoming-reporting condition table shown in FIG. 8, the sequence number has a value in the range 1 to 5, the maximum number of criteria per record is 5 and a column of a criterion logic expression is added to the table.

Much like the incoming-reporting condition table shown in FIG. 4, if "The partner making the phone call is a person named A" stated by criterion 1 in the record pointed to by the sequence number 1 is satisfied, the value of the video priority mode is OFF meaning that the operation to report an incoming to the user takes precedence of the video reproduction.

The record pointed to by the sequence number 2 includes criterion 1 stating: "Sunday" and criterion 2 stating: "20:00-22:00." Combined by a criterion logic expression of (Criterion 1)*(Criterion 2), these criteria are set on the assumption that known people make a large number of phone calls on Sundays during the time period 20:00 to 22:00. The communication terminal 10 can thus be used in such a way that an operation to report arrivals of such phone calls to the user takes precedence of a video reproduction.

The record pointed to by the sequence number 3 includes criterion 1 stating: "08:45-17:15," criterion 2 stating: "Weekday" and criterion 3 stating: "12:00-12:45". Combined by a criterion logic expression of (Criterion 1)*(Criterion 2) # (Criterion 3), these criteria are set in order to use the communication terminal 10 in such a way that an incoming is reported to the user during business hours from 08:45 to 17:15 on any weekday by taking precedence of a video reproduction except during a lunch time from 12:00 to 12:45.

The record pointed to by the sequence number 4 includes criterion 1 stating: "Moving," criterion 2 stating: "Weekday," criterion 3 stating: "07:45-08:30," criterion 4 stating: "21:00-22:00" and criterion 5 stating: "The partner making the phone call is a person named B." Combined by a criterion logic expression of (Criterion 1)*(Criterion 2)*{(Criterion 3)+ (Criterion 4)} # (Criterion 5) these criteria are set on the assumption that, during the time period 07:45-08:30 on a weekday, the user is on the way to the office, being on board of a public transport facility and, during the time period 21:00-22:00 on a weekday, the user is on the way home, also being on board of a public transport facility. The communication terminal 10 can thus be used in such a way that a video reproduction takes precedence of an operation to report the arrival of a phone call to the user if the phone call is received when the user is in motion on the aforementioned way to the office or the aforementioned way home on a weekday except that the phone call is made by a phone-conversation person named B. That is to say, in the case of a phone call made only by a phone-conversation person named B, the user must display a sense of urgency to answer the telephone. In this case, the arrival of such a phone call is reported to the user, taking precedence of a video reproduction.

The record pointed to by the sequence number 5 includes criterion 1 stating: "Watching already recorded video," criterion 2 stating: "The present position is home" and criterion 3 stating: "Variety program." Combined by a criterion logic expression of (Criterion 1)+(Criterion 2)+(Criterion 3), these criteria are set in order to use the communication terminal 10 in such a way that the arrival of an incoming that is received while the user is watching an already recorded video, the user is at home or the user is watching a variety TV program is reported to the user, taking precedence of the video reproduction. This is because the seeing and hearing of an already recorded video can be resumed later and, if the user is at home at the present time, the current program can be watched from the TV set at home. As for a variety TV program, the arrival of such an incoming is reported to the user because a variety TV program is not considered to be a program of much importance to the user.

It is to be noted that broadcasted data of a digital broadcast and data acquired by using an EPG function includes various kinds of information. For example, the information includes not only the aforementioned start and end times of a program, but also channels, program names, program attributes, film starts and talents performing in programs and commentaries on contents of programs. The program attributes include a news program, a variety program, a movie and a drama. By using the information in criteria, a variety of criteria can be set and the communication terminal 10 can hence be used with a high degree of convenience. The control unit 14 fetches the information from broadcasted data of a digital broadcast and data acquired by using an EPG function or, as an alternative, the information can also be acquired by using a dedicated line.

By referring to FIGS. 12 to 15, the following description explains a concrete technique adopted by the user to set incoming-reporting conditions included in the table shown in FIG. 8. The incoming-reporting conditions are set by entering a sequence number, a video priority mode, criteria and a criterion logic expression for each record of the table of incoming-reporting conditions through the key input unit 16. In operations to enter a sequence number, a video priority mode, criteria and a criterion logic expression for each record, it is desirable to specify the sequence number of the record to be followed by the video priority mode, criterion 1, criterion 2, - - - criterion 5 and the criterion logic expression, which are associated with the sequence number.

Figure 12:
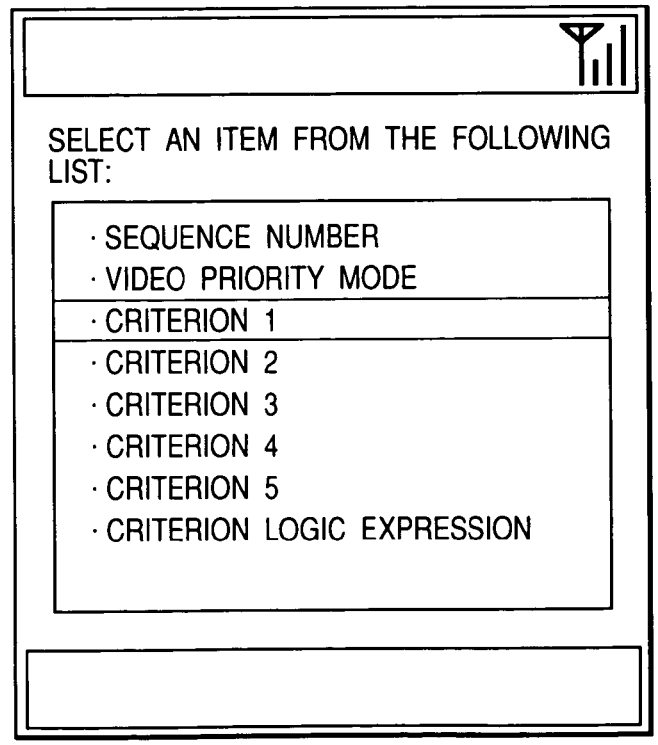
FIG. 12 is a diagram showing a first screen for setting incoming-reporting conditions.

FIG. 12 is a diagram of a screen showing a state in which the user has entered the number 1 as the sequence number and the value OFF as the video priority mode and is about to enter a value of criterion 1. The item criterion 1 on the screen is in a state of being selected. In a state of being selected, the colors of the characters and background of the item are inverted into colors different from the rest.

Figure 13:
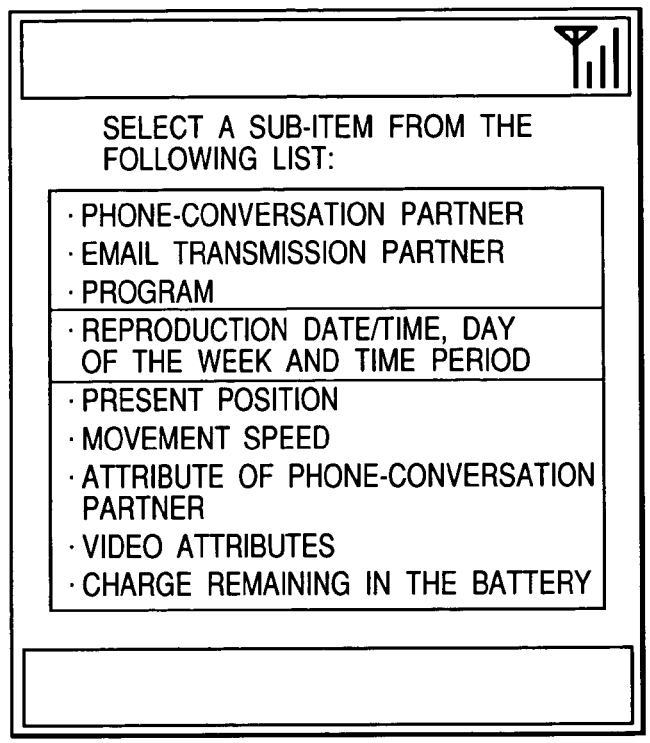
FIG. 13 is a diagram showing a second screen for setting incoming-reporting conditions.

As an OK button of the screen shown in FIG. 12 is pressed with the item criterion 1 selected, a screen shown in FIG. 13 is displayed on the display unit 17. FIG. 13 is a diagram of a screen showing a list of sub-items for item criterion 1. The sub-items to be selected by the user include the phone-conversation partner and the program. In this example, the user has selected the sub-item date/time, day of the week and time period of the program.

Figure 14:
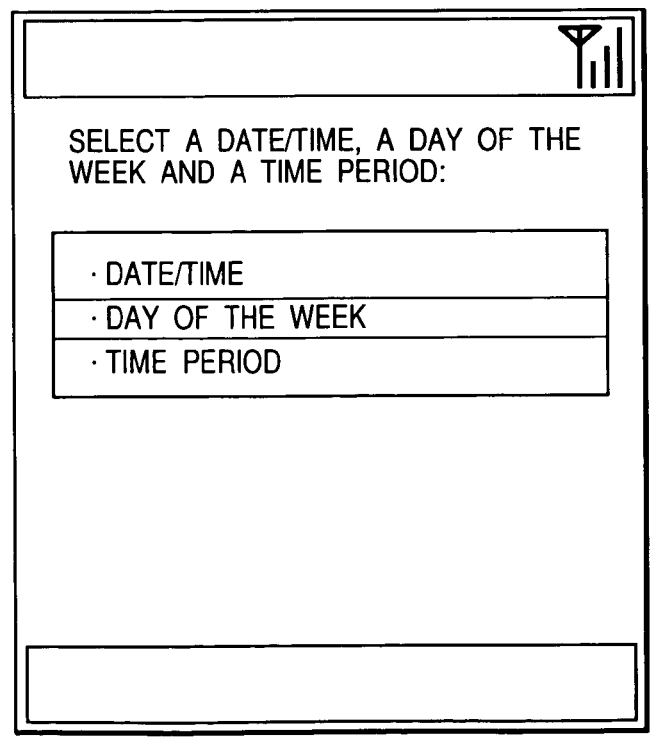
FIG. 14 is a diagram showing a third screen for setting incoming-reporting conditions.

As an OK button of the screen shown in FIG. 13 is pressed with the sub-item date/time, day of the week and time period of the program selected, a screen shown in FIG. 14 is displayed. FIG. 14 is a diagram of screen showing details of the sub-item date/time, day of the week and time period of the program. The details to be selected by the user include the date/time, the day of the week and the time period. In this example, the user has selected the day of the week.

Figure 15:
FIG. 15 is a diagram showing a fourth screen for setting incoming-reporting conditions.

As an OK button of the screen shown in FIG. 14 is pressed with the day of the week selected, a screen shown in FIG. 15 is displayed. FIG. 15 is a diagram of screen showing the days of the week and a holiday to be selected by the user. The days of the week range from Monday to Sunday. In this example, the user has selected Thursday.

As an OK button of the screen shown in FIG. 15 is pressed with Thursday selected, Thursday is confirmed. That is to say, in the table of incoming-reporting conditions, Thursday is set as criterion 1. Thus, an incoming received on a Thursday is reported to the user, taking precedence of a video reproduction because the video priority mode is set at the OFF value as described above.

It is to be noted that, as described above, the user sets incoming-reporting conditions by itself. However, implementations of the present invention are not limited to this configuration. It is also possible to provide such a configuration of the table of incoming-reporting conditions that, for example, a first arrival of an incoming received from a telephone-conversation partner named B in the course of watching program A is always reported to the user. However, a query stating: "YES/NO" is also displayed to ask the user a question as to whether or not to report the second or subsequent arrivals of the incoming received under the same conditions as the first arrival to the user. If the user selects the YES option, automatically, second and subsequent arrivals of an incoming received from a telephone-conversation partner named B in the course of watching program A are reported to the user. If the user selects the NO option, on the other hand, automatically, such arrivals are not reported to the user. In this way, the user does not have to set the incoming-reporting conditions for the second or subsequent arrivals of the incoming received under the same conditions as the first arrival by itself. It is thus possible to eliminate the labor and time for setting such incoming-reporting conditions. As a result, the complexity of the setting operations can be reduced.

In the configuration described above, only two criteria, i.e., "The partner making the phone call is a person named A" and "The name of the program being watched presently is B." However, it is also possible to provide a configuration in which one criterion or three or more criteria are set.

In addition, it is also possible to provide a configuration in which a telephone-conversation partner making a phone call a large number of times is regarded as a partner of importance to the user and, for incomings from this partner, the operation to report an incoming automatically to the user takes precedence of a video reproduction. It is also possible to provide another configuration in which a program watched everyday or every week is regarded as an important program and the video reproduction of such a program automatically takes precedence of the operation to report an incoming to the user. It is thus possible to set incoming-reporting conditions suitable for a situation in which the communication terminal is used.

What is claimed is:

1. A communication terminal comprising:
    a video reproduction device configured to carry out a video reproduction;
    a communication device configured to carry out a communication; and
    a reproduction-end-time acquisition device configured to acquire an end time of the video reproduction carried out by said video reproduction device;
    wherein, in the event of an incoming communication from a communication partner terminal, external to the communication terminal, in the course of the video reproduction carried out by said video reproduction device, said communication partner terminal is informed of the end time of said video reproduction, wherein the incoming communication from the communication partner terminal is a request for voice communications between the communication terminal and the communication partner terminal.

2. A communication terminal according to claim 1 wherein said communication partner terminal is informed of an end time of a video reproduction by transmitting a message including information on said end time of a video reproduction to said communication partner terminal.

3. A communication terminal according to claim 1 wherein said communication partner terminal is informed of an end time of a video reproduction by transmitting an email including information on said end time of a video reproduction to said communication partner terminal.

4. The terminal of claim 1, wherein during the video reproduction carried out by the video reproduction device, the terminal does not inform the user of the incoming communication from the communication partner terminal.

5. A communication terminal comprising:
    a video reproduction device configured to carry out a video reproduction;
    a communication device configured to carry out a communication;
    a reproduction-end-time acquisition device configured to acquire an end time of the video reproduction carried out by said video reproduction device;
    a storage device configured to store an incoming-reporting condition indicating whether a video reproduction takes precedence of an operation to report an incoming communication or said operation to report an incoming communication takes precedence of said video reproduction; and a setting device configured to set said incoming-reporting condition;

wherein, in the event of an incoming communication from a communication partner terminal external to the communication terminal in the course of the video reproduction carried out by said video reproduction device:

said communication partner terminal is informed of the end time of said video reproduction if said incoming-reporting condition is set to indicate that said video reproduction takes precedence of an operation to report said incoming communication; and said incoming communication is reported if said incoming-reporting condition is set to indicate that an operation to report said incoming communication takes precedence of said video reproduction, wherein the incoming communication from the communication partner terminal is a request for voice communications between the communication terminal and the communication partner terminal.

6. The terminal of claim 5, wherein when the incoming-reporting condition is set to indicate that said video reproduction takes precedence of an operation to report said incoming communication, the terminal does not inform the user of the incoming communication from the communication partner terminal.

7. A communication terminal comprising:
a TV-broadcast receiving device configured to receive a TV broadcast;
a display configured to display an image of a TV broadcast received by said TV-broadcast receiving device;
a communication device configured to carry out a communication; and
a program-end-time acquisition device configured to acquire an end time of a program of a TV broadcast received by said TV-broadcast receiving device;
wherein, if an incoming communication arrives from a communication partner terminal external to the communication terminal while said display means is carrying out an operation to display an image of a program of a TV broadcast, said communication partner terminal is informed of an end time of said program, wherein the incoming communication from the communication partner terminal is a request for voice communications between the communication terminal and the communication partner terminal.

8. A communication terminal according to claim 7 wherein said communication partner terminal is informed of an end time of a video reproduction by transmitting a message including information on said end time of a video reproduction to said communication partner terminal.

9. A communication terminal according to claim 7 wherein said communication partner terminal is informed of an end time of a video reproduction by transmitting an email including information on said end time of a video reproduction to said communication partner terminal.

10. A communication terminal according to claim 7 wherein:
said TV-broadcast receiving is configured to receive a digital broadcast; and
said program-end-time acquisition device is configured to acquire an end time of a program of a TV broadcast from information included in broadcasted data of a digital broadcast received by said TV-broadcast receiving device.

11. A communication terminal according to claim 7 wherein said program-end-time acquisition device is configured to acquire an end time of a program of a TV broadcast from information included in a program table distributed by an EPG.

12. A communication terminal comprising:
a TV-broadcast receiving device configured to receive a TV broadcast;
a display configured to display an image of a TV broadcast received by said TV-broadcast receiving device;
a communication device configured to carrying out a communication;
a program-end-time acquisition device configured to acquire an end time of a program of a TV broadcast received by said TV-broadcast receiving device;
a storage device configured to store an incoming-reporting condition indicating whether an operation to display an image of a TV broadcast takes precedence of an operation to report an incoming communication or said operation to report an incoming communication takes precedence of said operation to display an image of a TV broadcast; and
a setting device configured to set said incoming-reporting condition;
wherein, if an incoming communication arrives from a communication partner terminal external to the communication terminal while said display device is carrying out an operation to display an image of a program of a TV broadcast:
said communication partner terminal is informed of an end time of said program if said incoming-reporting condition is set to indicate that said operation to display an image of a program of a TV broadcast takes precedence of an operation to report said incoming communication; and
said incoming communication is reported if an incoming-reporting condition is set to indicate that an operation to report said incoming communication takes precedence of said operation to display an image of a program of a TV broadcast, wherein the incoming communication from the communication partner terminal is a request for voice communications between the communication terminal and the communication partner terminal.

13. The terminal of claim 12, when the incoming-reporting condition is set to indicate that said TV broadcast takes precedence of the operation to report said incoming communication, the terminal does not inform the user of the incoming communication from the communication partner terminal.

14. A video reproduction method for operating a communication terminal including a video reproduction device configured to carry out a video reproduction and a communication terminal configured to communicate with a communication partner terminal external to the communication terminal, wherein, when an incoming communication arrives to the communication terminal from the communication partner terminal in the course of a video reproduction:
an end time of said video reproduction is acquired; and
said communication partner terminal is informed of said end time of said video reproduction, wherein the incoming communication from the communication partner terminal is a request for voice communications between the communication terminal and the communication partner terminal.

15. The method of claim 14, wherein during the video reproduction, the user is not informed of the incoming communication from the communication partner terminal.

16. A video reproduction method for operating a communication terminal including a TV-broadcast receiving device configured to receive a TV broadcast, a display configured to play a TV broadcast program, and a communication device configured to carry out a communication with a communication partner terminal external to the communication terminal, wherein, when an incoming communication arrives to the communication terminal from the communication partner terminal in the course of playing the TV broadcast program on the terminal device:

an end time of said program is acquired; and said communication partner terminal is informed of said end time of said program, wherein the incoming communication from the communication partner terminal is a request for voice communications between the communication terminal and the communication partner terminal.

17. The method of claim 16, wherein during playing the program, the user is not informed of the incoming communication from the communication partner terminal.

* * * * *